United States Patent
Thornton et al.

(10) Patent No.: US 9,015,305 B1
(45) Date of Patent: *Apr. 21, 2015

(54) SYSTEMS AND METHODS FOR DATA SOURCE MANAGEMENT

(75) Inventors: Shannon Thornton, San Antonio, TX (US); Anantrachai Kaewlium, San Antonio, TX (US); James Lutz, Pipe Creek, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/596,665

(22) Filed: Aug. 28, 2012

Related U.S. Application Data (63) Continuation of application No. 11/538,430, filed on Oct. 3, 2006, now Pat. No. 8,255,504.

(51) Int. Cl.
*G06F 17/30* (2006.01)

(52) U.S. Cl.
CPC ................. *G06F 17/30002* (2013.01)

(58) Field of Classification Search
USPC .................. 709/223, 224; 719/328
See application file for complete search history.

(56) References Cited

U.S. PATENT DOCUMENTS

| | | | |
|---|---|---|---|
| 4,899,373 A | 2/1990 | Lee et al. | |
| 5,613,109 A | 3/1997 | Yamauchi et al. | |
| 5,881,380 A | 3/1999 | Mochizuki et al. | |
| 6,023,694 A | 2/2000 | Kouchi et al. | |
| 6,249,291 B1 | 6/2001 | Popp et al. | |
| 6,311,213 B2 | 10/2001 | Dawson et al. | |
| 6,502,001 B1 | 12/2002 | Kurono et al. | |
| 6,578,068 B1 | 6/2003 | Bowman-Amuah | |
| 6,625,617 B2 | 9/2003 | Yarnall et al. | |
| 6,738,773 B1 | 5/2004 | Reunert et al. | |
| 6,915,316 B1 | 7/2005 | Patterson et al. | |
| 7,111,006 B2 | 9/2006 | Vange et al. | |
| 7,203,732 B2 | 4/2007 | McCabe et al. | |
| 7,299,332 B1 | 11/2007 | Misra et al. | |
| 7,464,070 B2 | 12/2008 | Yagawa | |
| 2002/0049776 A1 | 4/2002 | Aronoff et al. | |
| 2003/0014526 A1* | 1/2003 | Pullara et al. | 709/227 |
| 2003/0078934 A1 | 4/2003 | Cappellucci et al. | |
| 2003/0120593 A1* | 6/2003 | Bansal et al. | 705/39 |
| 2003/0126200 A1 | 7/2003 | Wolff | |
| 2004/0006622 A1 | 1/2004 | Burkes et al. | |
| 2004/0103194 A1* | 5/2004 | Islam et al. | 709/225 |
| 2004/0162836 A1 | 8/2004 | Aronoff et al. | |
| 2004/0250248 A1 | 12/2004 | Halpern et al. | |
| 2005/0246575 A1* | 11/2005 | Chen et al. | 714/6 |
| 2006/0195659 A1 | 8/2006 | Kano | |

(Continued)

OTHER PUBLICATIONS

An Office Action from U.S. Appl. No. 11/538,430 mailed Apr. 11, 2008, 3 pgs.

(Continued)

*Primary Examiner* — Mahesh Dwivedi
(74) *Attorney, Agent, or Firm* — Joseph A. Fuchs; Nixon Peabody LLP (57) ABSTRACT

Systems and methods for data source management using custom data sources are described. The system includes a custom data source created in response to a data source request, and a number of configuration modules to handle obtaining a connection with a data source. Other embodiments are also described.

5 Claims, 6 Drawing Sheets

(56) References Cited

U.S. PATENT DOCUMENTS

| | | |
|---|---|---|
| 2006/0206669 A1 | 9/2006 | Zhu et al. |
| 2006/0277275 A1* | 12/2006 | Glaenzer .................. 709/219 |
| 2007/0022141 A1 | 1/2007 | Singleton et al. |
| 2007/0055550 A1 | 3/2007 | Courtney et al. |
| 2007/0118653 A1 | 5/2007 | Bindal |
| 2007/0156869 A1 | 7/2007 | Galchev et al. |
| 2007/0203944 A1 | 8/2007 | Batra et al. |
| 2007/0214150 A1* | 9/2007 | Chace et al. .................. 707/10 |

OTHER PUBLICATIONS

"Using DataDirect Connect for JDBC Drivers", http://media.datadirect.com/download/docs/jdbc/jdbcref/usejdbc.html#wp1035065, Accessed: Oct. 11, 2006, 15 pgs.

* cited by examiner

SYSTEMS AND METHODS FOR DATA SOURCE MANAGEMENT

CROSS REFERENCES

This application is a Continuation of U.S. patent application Ser. No. 11/538,430, filed Oct. 3, 2006, now U.S. Pat. No. 8,255,504, and is related in subject matter to the following commonly assigned applications: U.S. application Ser. No. 11/538,425, filed Oct. 3, 2006; and U.S. application Ser. No. 11/538,428, filed Oct. 3, 2006.

TECHNICAL FIELD

Various embodiments described herein relate to computer systems, and more particularly to systems and methods for data source management.

BACKGROUND

Connecting user applications to various data sources can be a complex process. Differences between applications and between the types of data sources can make management a difficult task. A management tool may be used to control connections between a number of applications and number of data sources. Some management tools are invasive and manipulate the data on the data source or the code in the application or on an application server. Other management tools alter the SQL (Structured Query Language) code used by the application. Some other management tools do not provide extensible configurations to allow additional management options or compatibility with various applications or types of data sources. Some management tools do not provide a system for managing data sources that is transparent to a user or vendor application. Requiring changes in the code, whether it be the SQL, or the programming in the application or on the application server is invasive and not always simple to implement. Also, there is little benefit in having a management tool that is not compatible with all the applications or data sources on the network.

SUMMARY

Systems and methods for data source management using custom data sources are described. The system includes a custom data source created in response to a data source request, and a number of configuration modules to handle obtaining a connection with a data source. Other embodiments are also described.

DETAILED DESCRIPTION

The following detailed description is divided into four sections. The first section presents a system overview of the inventive subject matter. The second section provides methods of using example embodiments of the inventive subject matter. The third section describes example implementations. The fourth section describes the hardware and the operating environment in conjunction with which embodiments can be practiced.

System Overview

Figure 1:
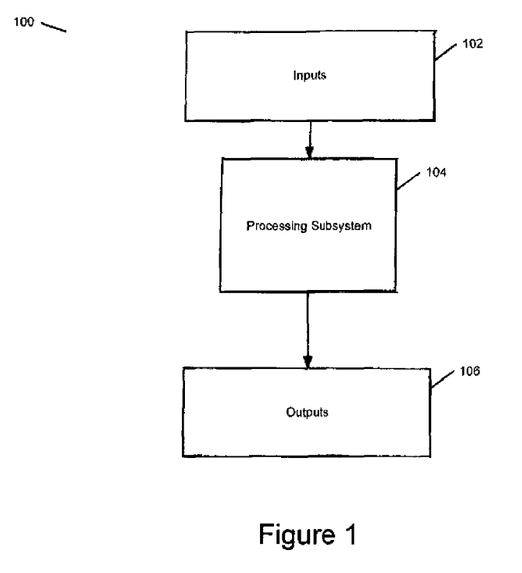
FIG. 1 is a block diagram of a data source management system according to various embodiments.

FIG. 1 comprises a block diagram of a system 100 for data source management. The system 100 comprises inputs 102, processing subsystem 104, and outputs 106.

The inputs 102 may include data source lookup requests, data source connection requests or other related requests. The requests may include other information including the source of the request, priority, security, or other information relevant to accessing data.

The processing subsystem 104 receives the inputs 102 and performs a function based upon its configuration. If the input 102 is a lookup request for a data source, the processing subsystem 104 will check through its configuration and look for the particular requested data source. If the data source is found, a positive response will be an output 106. If a data source cannot be found, the response at the output 106 will be in the negative.

If an input 102 is a request for a connection to a data source, the processing subsystem 104 will check through its configuration to determine the procedure for handling and obtaining a connection to the requested data source. The procedure may employ a number of steps utilizing inputs 102 and outputs 106 to perform functions including connection and availability status checks for example. At the end of the procedure, a determination is made whether the data source is available and a connection is possible. If the data source is available, the output 106 is a grant of the connection to the data source. If the data source is not available, the procedure may output a denial of the connection to the data source, an error, or may determine an alternate data source to grant a connection.

Embodiments of system 100 for managing data handle various requests to access data sources, and manage the connections according to various configurations.

Figure 2:
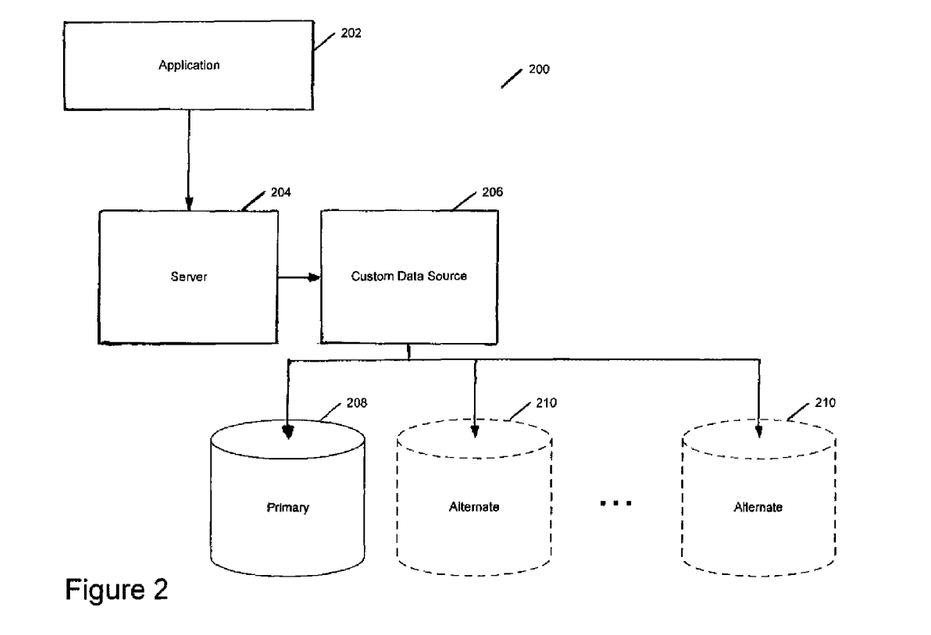
FIG. 2 is a more detailed block diagram of a data source management system according to various embodiments.

FIG. 2 is a block diagram of a system 200 for managing data according to various embodiments. The system 200 comprises an application 202, a server 204, a custom data source 206, a primary data source 208, and one or more alternate data sources 210.

The application 202 sends a request to the server 204. The request is in regard to a primary data source 208. When the request regarding the primary data source 208 reaches the server, a custom data source 206 may be created dynamically in response to the request. Alternatively, the custom data source 206 may be pre-existent at the time of the request. The server handles the request to direct a connection between the application 202 and a primary data source 208 or an alternate data source 210. Rather than creating a direct connection between the application 202 and the primary data source 208, the application 202 is connected to the custom data source 206.

The custom data source 206 responds to the request for the primary data source 208. As mentioned above the custom data source 206 may be dynamically created or pre-existing. A dynamically created custom data source 206 is created with a configuration based on the request from the application 202.

The specific data source request, the requestor's identity, or other information in the request may influence the configuration of the custom data source 206. For example, a particular requested data source may require load balancing or some other routine, and that would be reflected in the configuration of the custom data source 206. The custom data source 206 may also be pre-existing, in which case it would have a preset configuration that would determine how data source connection requests would be handled.

The custom data source 206 additionally checks to determine the availability of the primary data source 208 that was requested. According to various embodiments, a data source is available if it can accept a connection in accordance with any present rules or configurations which could impede connectivity. These rules or configurations may include but are not limited to load balancing, fail-over, throttle management, or others. For example, a data source may be physically able to accept a connection, but a particular rule or configuration may deem it unavailable. If the primary data source 208 is available, the custom data source 206 may grant a connection between the application 202 and the primary data source 208. If the primary data source 208 is not available, the custom data source 206 may refer to its configuration to determine an alternate data source 210 to check for availability. Once an available alternate data source 210 is determined, the custom data source 206 may then grant a connection between the application 202 and the alternate data source 210.

The primary data source 208 may be associated with one or more alternate data sources 210 in a number of ways. The primary data source 208 may use one-way replication, in which case an alternate data source 210 acts as a backup to the primary data source 208. Alternatively, the data sources may be two-way replication data sources, in which case, neither data source is secondary to the other, and modifications to the data in either data source are updated in the other. These are just two examples of many possible relationships between the primary data source 208 and alternate data sources 210. Any number of alternate data sources may exist with respect to the primary data source 208 or other alternate data sources 210.

Figure 3:
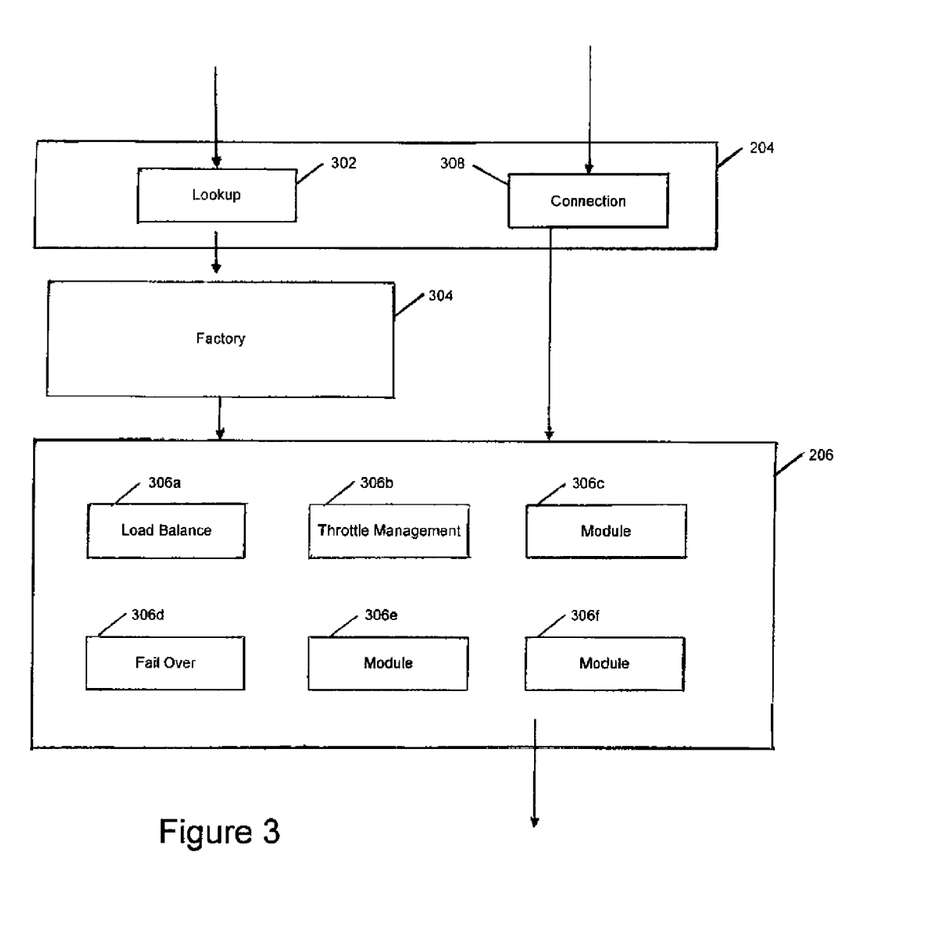
FIG. 3 is a more detailed block diagram of a custom data source system according to various embodiments.

FIG. 3 is a more detailed block diagram of the server 204 and the custom data source 206 of FIG. 2 according to various embodiments. FIG. 3 comprises a server 204, lookup module 302, connection module 308, factory 304, custom data source 206 and several configuration modules 306*a-f*.

Server 204 will generally receive a lookup request from a requestor regarding a particular data source. The lookup request is processed by a lookup module 302. The lookup module 302 may contain a listing of existing data sources that the server 204 is in communication with or may be connected to. The lookup module 302 may contain a particular name or directory service. Example name services may include but are not limited to JNDI (Java Naming and Directory Interface). The lookup module 302 will use the name or directory service to determine if the requested data source exists. The result is communicated back to the requester.

If the lookup module 302 determines that the data source is in its listing, then the factory initiates the creation of a custom data source 206 based on the requested data source. The custom data source 206 may be created with a configuration customized for the requested data source. This configuration might contain a number of arrangements of various configuration modules 306. The configuration modules 306 help manage a connection to the requested data source.

After the lookup module 302 communicates back to the requestor that the data source exists in its directory, the requestor may make a request for a connection to the data source. The server 204 receives the request for a connection at the connection module 308. The connection module 308 provides a connection between the requestor and the requested data source. In this case, the custom data source 206 takes the place of the requested data source. The custom data source 206 steps in to manage the connection. The configuration modules 306*a-f* handle the process of obtaining a data source connection. A load balance configuration module 306*a* may be for example a module to provide load balancing for a particular data source. Multiple mirrored versions of a particular data source may exist, and the load balance configuration module 306*a* may distribute connection among the various data source mirrors. Additionally, a fail over configuration module 306*d* may handle determining where a connection should be redirected to when another data source connection fails. Various other configuration modules 306*a-f* including a throttle management module 306*b* or other data source connection control may be implemented in the custom data source 206 as well.

Once the custom data source 206 runs through the configuration modules 306*a-f*, a connection with the requested data source, or an associated data source (i.e. a mirror, or backup) may be obtained. Once the custom data source 206 has that connection, data source access may be granted to the requestor. The custom data source 206 takes the connection with the other data source and wraps it in the current connection with the requestor. This allows the presence of the custom data source to be transparent to the requestor. While the requestor is connected to the requested data source or one associated with the requested data source, the custom data source may wait inactive, and allow the connection to proceed. When the requestor is finished accessing the requested data source (or an associated one), the custom data source 206 may step in to close the connection with the data source and with the requestor. This allows the custom data source 206 to update internal information used by the rules or configurations described above.

Methods

In this section, particular methods of example embodiments are described by reference to a series of flow charts. The methods to be performed may constitute computer programs made up of computer-executable instructions.

Figure 4:
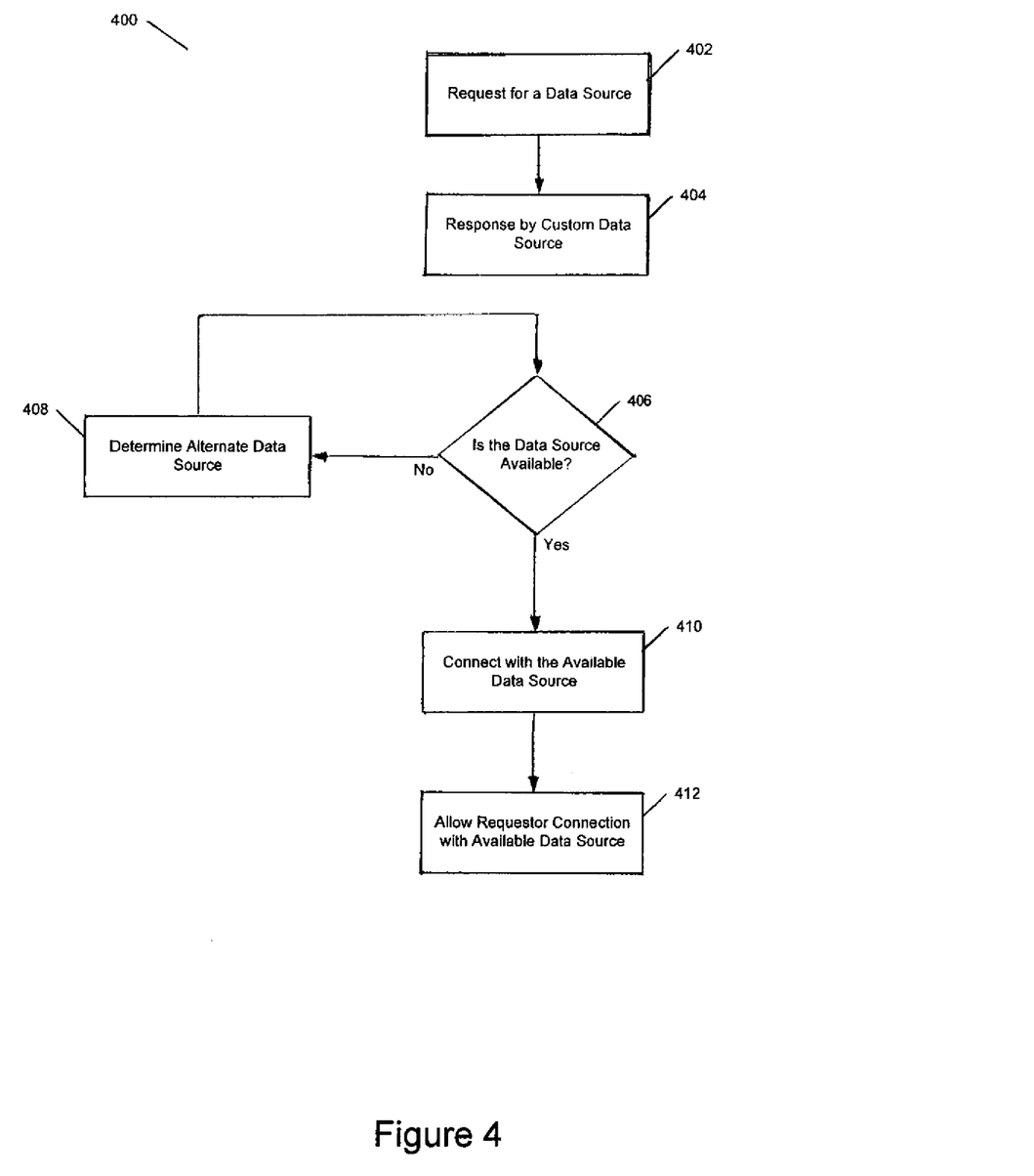
FIG. 4 is a flow diagram illustrating a method according to various embodiments.

FIG. 4 is a simple flow diagram illustrating a method 400 according to various embodiments. The method 400 begins with a request from a requestor for a data source (block 402). In one embodiment, a subsystem for detecting the request may include the factory 304 shown in FIG. 3. Once received, a custom data source responds to the request and a connection may be formed with the requestor (block 404). The response by a custom data source takes the place of a response by the requested data source. After the custom data source responds to the request, a determination is made as to whether the requested data source is available (block 406). An available data source is a data source that is open for new connections. Factors which may influence the availability of a data source include, but are not limited to, load balancing, throttle management, status on the network, operational status, or other factors.

If the data source is determined not to be available, then an associated alternate data source may be considered (block 408). An alternate data source may be associated with the requested data source in a number of ways, and will be able to fulfill the request for the originally requested data source. Once a particular alternate data source is determined for consideration, another determination of availability is made (block 406). If the alternate data source is not available, a further alternate data source may be considered (block 408). This process may repeat until there are no further associated alternate data sources to consider, or it is determined that one is available (clock 406).

If a particular data source is determined to be available, a connection with that data source may be made (block 410). The custom data source creates a connection with the available data source, and wraps that connection in its already existing connection with the requestor in order to allow the requester to be connected with the available data source (block 412). Wrapping the connection with the available data source in the existing connection between the custom data source and the requestor allows the transition to be seamless and transparent to the requester. Additionally, the operations performed by the custom data source may be performed by any subsystem with data source management capabilities.

Figure 5:
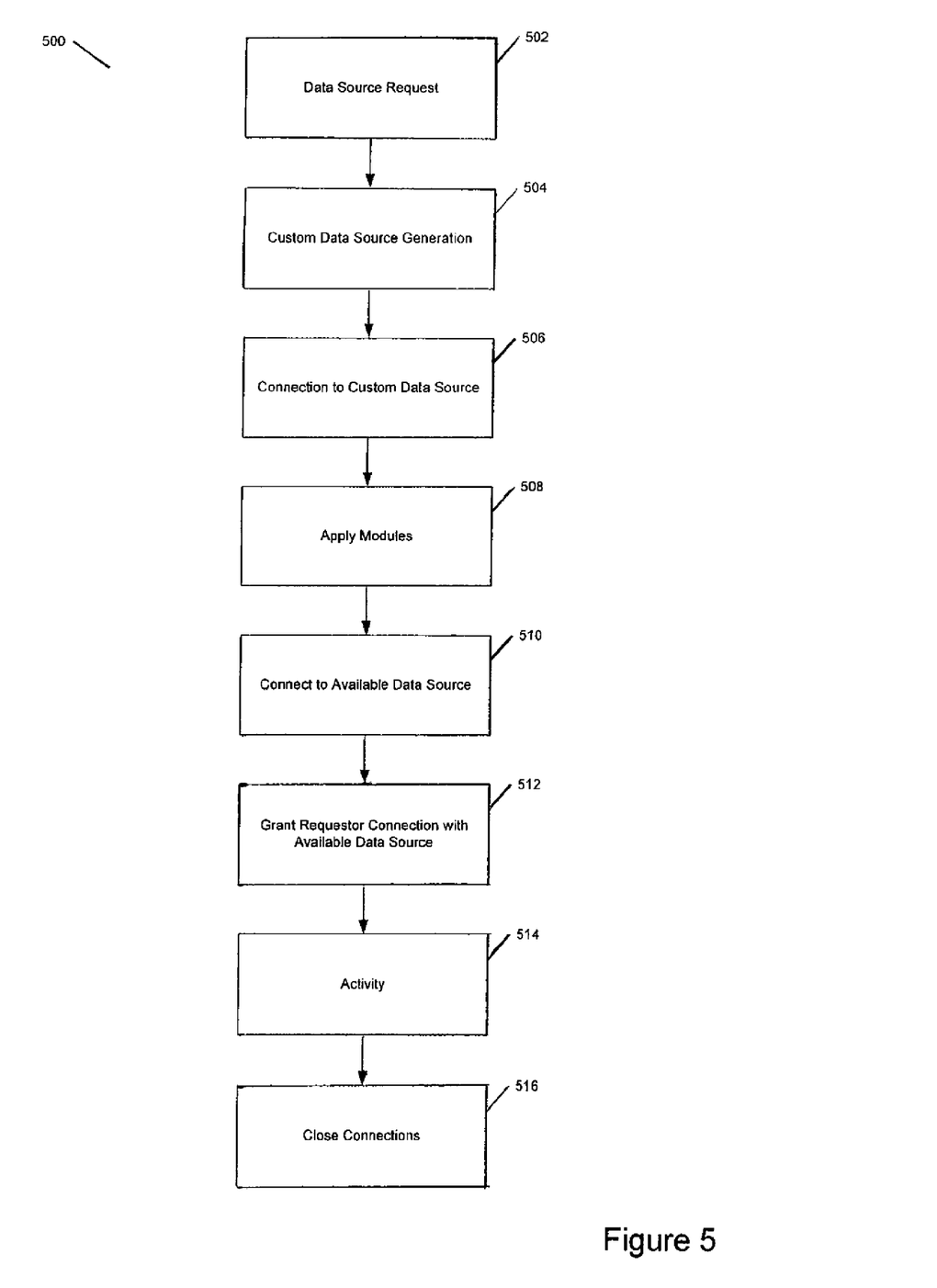
FIG. 5 is a more detailed flow diagram illustrating several methods according to various embodiments.

FIG. 5 is a flow diagram illustrating method 500 according to various embodiments. The method 500 begins with a data source request by a requestor (block 502). In response to receiving the request at a server, a custom data source is generated (block 504). The custom data source is generated with a configuration which may be tailored to the specific requested data source. The requestor is then connected to the custom data source (block 506). The configuration of the custom data source includes one or more modules which are used to facilitate and manage a connection with the requested data source or an associated data source. The modules are applied to provide management functions such as load balancing, throttle management, fail-over routines, or other functions (block 508). The application of these modules allows the custom data source to determine if the requested data source is available, and if not whether an associated data source is available as an alternative.

Once an available data source is determined, the custom data source may connect with the available data source (block 510). Next, the requestor is granted a connection with that available data source (block 512). The connection may be wrapped in the already existing connection between the custom data source and the requestor in order to make the handoff transparent to the requestor. Once the requester is granted a connection with the available data source, activity on the available data source may commence (block 514). When the requester is finished with its activity on the available data source, the custom data source may close the connection with the requestor and the connection with the available data source (block 516).

Example Implementations

Various examples of systems and methods for example embodiments of the inventive subject matter have been described above.

Figure 6:
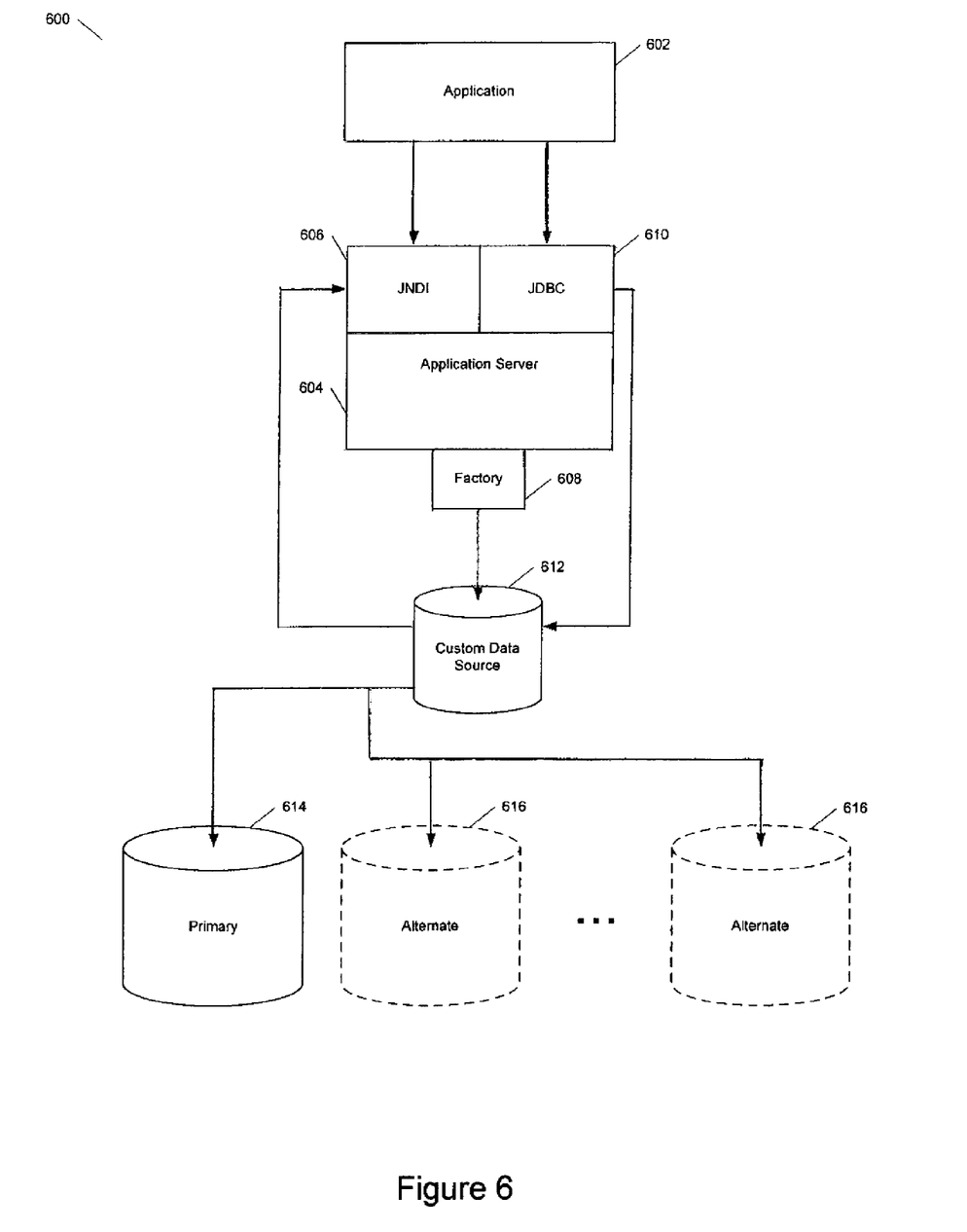
FIG. 6 is a diagram of an example implementation of a system according to various embodiments.

FIG. 6 is an example implementation of a system 600 according to various embodiments. FIG. 6 comprises an application 602, an application server 604 including a JNDI (Java Naming and Directory Interface) API (Application programming interface) 606 and a JDBC (Java Database Connectivity) API 610, a factory module 608, a custom data source 612, a primary data source 614, and one or more alternate data sources 616.

The application 602 includes software which utilizes data stored remotely from the application 602. In order for the application 602 to retrieve certain data, it issues a data source lookup request to the application server 604. In one embodiment, the application server 604 may be a WebSphere application server. According to some embodiments, application server 604 is a J2EE (Java 2, Enterprise Edition) server, it uses the JNDI API 606 for directory services. When the JNDI lookup is performed, the factory module 608 generates a custom data source 612 to take the place of the primary data source 614 which was the subject of the lookup request. Upon receiving a positive response to the lookup request, the application 602 may request a connection with the data source that was the subject of the lookup request. The request is sent to the application server 604, and directed toward the JDBC API 610 to provide access to the data source. Because the custom data source 612 takes the place of the identifier for the requested data source, the JDBC API 610 enables a connection between the application 602 and the custom data source 612.

The custom data source 612 is configured to handle access management for the requested data source. This configuration may include subsystems or algorithms to provide for fail-over routines, load balancing, throttle management, or other functions. Additionally, the configuration of the custom data source 612 may be designed to interact with various external modules that provide functions like those just mentioned, such as throttle management. The custom data source 612 will use its configuration to determine whether a primary data source 614 to fulfill the request from the application 602 is available.

If available, the custom data source 612 makes a connection with the primary data source 614. The connection with the primary data source 614 will be wrapped in the already existing connection between the custom data source 612 and the application 602. The handoff of the primary data source 614 between the custom data source 612 and the application 602 will be transparent to the application 602, and there is no noticeable change in its connection status.

If the primary data source 614 is determined to not be available by the custom data source 612, then the configuration of the custom data source 612 may indicate one or more alternate data sources 616. Access to the alternate data sources 616 will be determined by the configuration of the custom data source 612 in the same way that the availability of the primary data source 614 was determined. If a particular alternate data source 616 is deemed available, the custom data source 612 connects and handoffs in a similar fashion as it would do with the primary data source 614.

Hardware and Operating Environment

This section provides an overview of an example hardware and the operating environments in conjunction with which embodiments of the inventive subject matter can be implemented.

A software program may be launched from a computer-readable medium in a computer-based system to execute functions defined in the software program. Various programming languages may be employed to create software programs designed to implement and perform the methods disclosed herein. The programs may be structured in an object-orientated format using an object-oriented language such as Java or C++. Alternatively, the programs may be structured in a procedure-orientated format using a procedural language, such as assembly or C. The software components may communicate using a number of mechanisms well known to those skilled in the art, such as application program interfaces or inter-process communication techniques, including remote procedure calls. The teachings of various embodiments are not limited to any particular programming language or environment. Thus, other embodiments may be realized, as discussed regarding FIG. 7 below.

Figure 7:
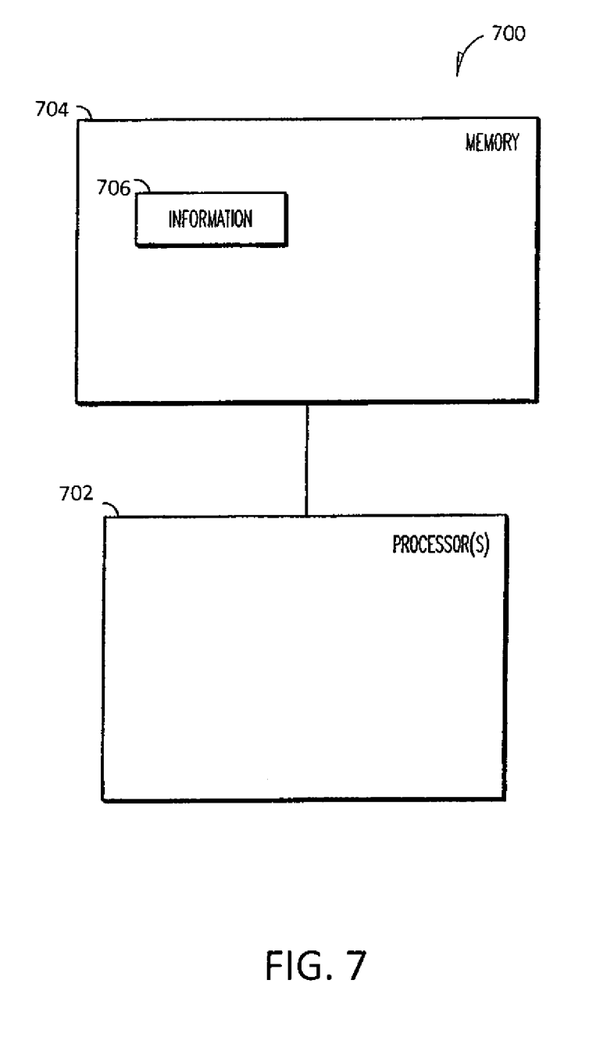
FIG. 7 is a block diagram of an article according to various embodiments.

FIG. 7 is a block diagram of an article 700 according to various embodiments of the invention. Such embodiments may comprise a computer, a memory system, a magnetic or optical disk, some other storage device, or any type of electronic device or system. The article 700 may include one or more processor(s) 702 coupled to a machine-accessible medium such as a memory 704 (e.g., a memory including electrical, optical, or electromagnetic elements). The medium may contain associated information 706 (e.g., computer program instructions, data, or both), which, when accessed, results in a machine (e.g., the processor(s) 702) performing the activities previously described herein.

Implementing the apparatus, systems, subsystems and methods disclosed herein may permit transparent configurable and extensible management of data source connections between various types of applications and various data sources.

Such embodiments of the inventive subject matter may be referred to herein individually or collectively by the term "invention" merely for convenience and without intending to voluntarily limit the scope of this application to any single invention or inventive concept, if more than one is in fact disclosed. Thus, although specific embodiments have been illustrated and described herein, any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

In the foregoing Detailed Description, various features are grouped together in a single embodiment for the purpose of streamlining the disclosure. This method of disclosure is not to be interpreted as reflecting an intention that the claimed embodiments of the invention require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate preferred embodiment.

It is emphasized that the Abstract is provided to comply with 37 C.F.R. §1.72(b) requiring an Abstract that will allow the reader to quickly ascertain the nature and gist of the technical disclosure. It is submitted with the understanding that it will not be used to interpret or limit the scope or meaning of the claims.

What is claimed is:

1. A system, comprising:
    a processor and a memory;
    a server executed by the processor and deployed within the memory to detect a data source lookup request from a requestor for a first data source;
    a lookup module containing a listing of data sources that the server is in communication and using the processor to determine whether the first data source is in the listing;
    a factory for dynamically generating, in response to determining the first data source is in the listing, a custom data source separate from the server and configured with modules to manage a connection between the custom data source and the first data source and a number of alternate data sources, the modules including load balancing, fail over, and throttle management; and
    a connection module for connecting the requestor with the first data source when the first data source is determined to be available, and for connecting to one of the number of alternate data sources when the first data source is unavailable.

2. The system of claim 1, wherein the system is configured to, when the first data source is determined to be available for the first data source connection, establish by the processor the first data source connection between the custom data source and the first data source in response to receiving the custom data source connection request, manage the connection using the custom data source, and close the connection using the custom data source.

3. The system of claim 1, wherein the system is configured to determine by the processor whether one of the number of alternate data sources is available for a second data source connection by iteratively searching the number of alternate data sources for an available one of the number of alternate data sources, wherein the determination whether one of the number of alternate data sources is available for the second data source connection is based on the customer data source connection request.

4. The system of claim 3, wherein the system is configured to, when one of the number of alternate data sources is determined to be available for the second data source connection, establish by the processor the one of the number of alternate data sources connection between the custom data source and the second data source in response to the receiving of the custom data source connection request, manage the connection using the custom data source, and close the connection using the custom data source.

5. The system of claim 1, wherein the custom data source is generated dynamically based on the data source lookup request.

* * * * *